US010891098B2

(12) United States Patent
Okano (10) Patent No.: US 10,891,098 B2
(45) Date of Patent: Jan. 12, 2021

(54) DISPLAY DEVICE AND METHOD FOR CONTROLLING DISPLAY DEVICE

(71) Applicant: SEIKO EPSON CORPORATION, Tokyo (JP)

(72) Inventor: Shuji Okano, Oita (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/111,741

(22) Filed: Aug. 24, 2018

(65) Prior Publication Data

US 2019/0065130 A1 Feb. 28, 2019

(30) Foreign Application Priority Data

Aug. 25, 2017 (JP) ................. 2017-162014

(51) Int. Cl.
*G09G 3/00* (2006.01)
*G09G 5/00* (2006.01)
*G06F 3/14* (2006.01)

(52) U.S. Cl.
CPC .............. *G06F 3/14* (2013.01); *G09G 3/002* (2013.01); *G09G 5/003* (2013.01); *G09G 5/006* (2013.01); *G09G 2340/10* (2013.01); *G09G 2354/00* (2013.01); *G09G 2370/16* (2013.01)

(58) Field of Classification Search
CPC .......... G06F 3/14; G09G 3/002; G09G 5/003; G09G 5/006; G09G 2340/10; G09G 2354/00; G09G 2370/16

USPC .......................................................... 715/700
See application file for complete search history.

(56) References Cited

U.S. PATENT DOCUMENTS

| 9,329,467 | B2 | 5/2016 | Ozawa et al. |
| 2013/0167246 | A1* | 6/2013 | Lee ................. G06F 21/60 726/26 |
| 2013/0176415 | A1* | 7/2013 | Kim ................. H04N 21/44218 348/78 |
| 2014/0176918 | A1 | 6/2014 | Ozawa et al. |
| 2016/0216876 | A1* | 7/2016 | Lee ................. G06F 3/04842 |
| 2017/0286047 | A1* | 10/2017 | Patil .................. G06F 3/0346 |
| 2018/0285051 | A1* | 10/2018 | Cawley ............... H04W 4/80 |

FOREIGN PATENT DOCUMENTS

| JP | 2006-293121 A | 10/2006 |
| JP | 2011-107565 A | 6/2011 |
| JP | 2012-186602 A | 9/2012 |
| JP | 2014-126572 A | 7/2014 |
| JP | 2016-130878 A | 7/2016 |

* cited by examiner

*Primary Examiner* — Jacinta M Crawford
(74) *Attorney, Agent, or Firm* — Oliff PLC (57) ABSTRACT

A projector includes an image projection unit which projects an image; a first communication unit which detects an information processing device connectable via wireless communication; and a control unit which causes the image projection unit to project a guidance image including a necessary operation to connect the projector to the information processing device, when the first communication unit detects the information processing device.

7 Claims, 5 Drawing Sheets

DISPLAY DEVICE AND METHOD FOR CONTROLLING DISPLAY DEVICE

CROSS-REFERENCE

The entire disclosure of Japanese Patent Application No. 2017-162014, filed Aug. 25, 2017 is expressly incorporated by reference herein.

BACKGROUND

1. Technical Field

The present invention relates to a display device and a method for controlling a display device.

2. Related Art

According to the related art, a display device is known which stores display information about operation settings, confirmation menu, guidance, operation state, processing results and the like and displays the stored information in response to a command from a control unit, as disclosed in JP-A-2006-293121. For example, a display device which can connect to an information processing device via wireless communication can display a guidance screen for guiding a user in connecting to the information processing device, based on an operation on a remote controller, an operation button or the like. Thus, the user can connect the display device to the information processing device quickly and easily by referring to the displayed guidance screen.

However, a user who does not know how to get the guidance screen displayed on the display device needs to find an explanation about the connection method in an operation manual book and carry out the connection setting with reference to the explanation thus found. Finding a desired explanation in the operation manual takes time and effort and therefore leads to inconvenience of operation.

SUMMARY

An advantage of some aspects of the invention is that a guide screen for connecting a display device to an information processing device is properly displayed.

The invention can be implemented as the following forms or application examples.

APPLICATION EXAMPLE 1

A display device according to this application example includes: a display unit which displays an image; a detection unit which detects an information processing device connectable via wireless communication; and a control unit which causes the display unit to display a guide image including a necessary operation to connect the display device to the information processing device, when the detection unit detects the information processing device.

With such a configuration, when the display device detects an information processing device connectable via wireless communication, the display device displays on the display unit a guide image including a necessary image to connect to the information processing device. This enables the user to carry out the necessary operation to connect to the information processing device according to the displayed guide image. Therefore, the display device and the information processing device can be connected to each other easily and quickly. The convenience of operation is thus improved.

APPLICATION EXAMPLE 2

In the display device according to the application example, it is preferable that the detection unit detects the information processing device located within a predetermined distance from the display device.

With such a configuration, the display device displays the guide image if the information processing device is detected within a predetermined distance. Therefore, the display device can properly display the guide image corresponding to the information processing device.

APPLICATION EXAMPLE 3

In the display device according to the application example, it is preferable that the control unit determines whether the information processing device detected by the detection unit and the display device have ever been connected to each other or not, causes the display unit to display the guide image if the display device has ever been connected to the information processing device, and does not cause the display unit to display the guide image if the display device has never been connected to the information processing device.

With such a configuration, the display device is able to display the guide image if the display device has ever been connected to the detected information processing device, and not to display the guide image if the display device has never been connected to the information processing device.

APPLICATION EXAMPLE 4

In the display device according to the application example, it is preferable that the control unit determines whether the display device has ever been connected to the information processing device detected by the detection unit or not, and decides the guide image displayed on the display unit, based on the result of the determination.

With such a configuration, the display device can display the guide image according the history of connection to the detected information processing device. This makes it easier to display the guide image for the connection method intended by the user and thus improves convenience.

APPLICATION EXAMPLE 5

In the display device according to the application example, it is preferable that the control unit causes the display unit to display the guide image if the information processing device detected by the detection unit is registered.

With such a configuration, the display device can display the guide image if the information processing device is registered. This makes it easier to display the guide image for the connection method intended by the user and thus improves convenience.

APPLICATION EXAMPLE 6

In the display device according to the application example, it is preferable that the control unit causes the display unit to display the guide image if a connection method which enables connection with the information processing device detected by the detection unit is a predetermined method.

With such a configuration, the display device can display the guide image if the display device connects to the information processing device by a predetermined connection method.

APPLICATION EXAMPLE 7

In the display device according to the application example, it is preferable that the control unit does not cause the display unit to display the guide image if the display unit is displaying the image.

With such a configuration, the visibility of the image displayed by the display unit can be prevented from falling due to the guide image.

APPLICATION EXAMPLE 8

In the display device according to the application example, it is preferable that the control unit causes the display unit to display the guide image according to a display state of the image on the display unit.

With such a configuration, the guide image is displayed according to the display state of the image displayed by the display unit. This can optimize the display on the display unit.

APPLICATION EXAMPLE 9

In the display device according to the application example, it is preferable that the control unit ends the display of the guide image displayed on the display unit, if the information processing device detected by the detection unit can no longer be detected.

With such a configuration, the display device is able not to display the guide image if the information processing device detected by the detection unit can no longer be detected.

APPLICATION EXAMPLE 10

It is preferable that the display device according to the above application example includes a receiving unit which receives data of the image transmitted from the information processing device connected thereto.

With such a configuration, the display device can acquire data of the image from the connected information processing device.

APPLICATION EXAMPLE 11

A method for controlling a display device according to this application example includes: detecting an information processing device connectable via wireless communication; displaying a guide image including a necessary operation to connect the display device to the information processing device, if the information processing device is detected.

With such a configuration, when the display device detects an information processing device connectable via wireless communication, the display device displays on a display unit a guide image including a necessary image to connect to the information processing device. This enables the user to carry out the necessary operation to connect to the information processing device according to the displayed guide image. Therefore, the display device and the information processing device can be connected to each other easily and quickly. The convenience of operation is thus improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Embodiment

Figure 1:
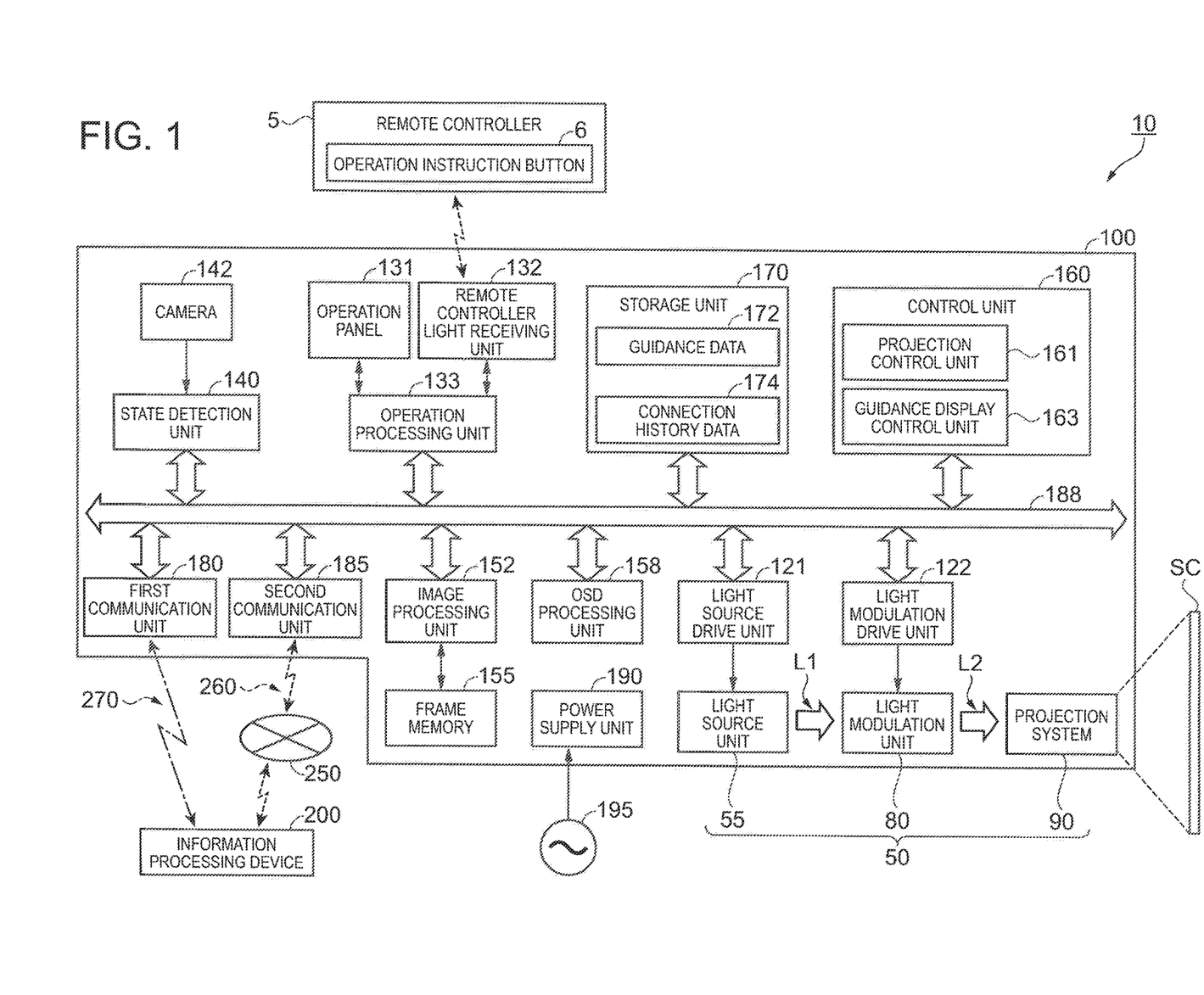
FIG. 1 shows the configuration of an image display system according to an embodiment.

FIG. 1 shows the configuration of an image display system 10.

The image display system 10 includes a projector 100 as a display device and an information processing device 200. The projector 100 and the information processing device 200 are connectable to each other via communication.

The projector 100 can project an image based on image data supplied from the information processing device 200, onto a screen SC.

The projector 100 has a first communication unit 180 and a second communication unit 185.

The first communication unit 180 has a communication interface supporting short-range wireless communication such as Bluetooth (trademark registered) or Bluetooth Low Energy (trademark registered) and thus communicates with the information processing device 200 supporting such a communication interface, via radio waves 270 as a transmission medium. In this embodiment, the first communication unit 180 is equivalent to a detection unit which detects the information processing device 200 connectable via short-range wireless communication. That is, the first communication unit 180 transmits a search signal based on a predetermined protocol such as Bluetooth by broadcast in response to an instruction from a control unit 160 and outputs to the control unit 160 information of the information processing device 200 which received a response signal corresponding to the search signal.

As already known, the available communication range of Bluetooth or Bluetooth Low Energy is approximately several meters. Therefore, it is conceivable that the information processing device 200 transmitting the response signal is located within a predetermined distance such as several meters from the projector 100 and that an image projected by the projector 100 is visible from the position of the information processing device 200.

The second communication unit 185 has a communication interface supporting wireless LAN such as WiFi (trademark registered) or a communication interface supporting screen mirroring and is connected to information processing device 200 via a network 250 and radio waves 260 as a transmission medium. The available communication area of the second communication unit 185 may be broader than the available communication area of the first communication unit 180.

The second communication unit 185 functions as a receiving unit which receives data of an image to be projected by the projector 100 from the connected information processing device 200. The image data received by the second communication unit 185 is sent to an image processing unit 152. The second communication unit 185 can also transmit various data to the connected information processing device 200.

The communication by the first communication unit 180 is not limited to communication via the radio waves 270 and can also be communication via other transmission media such as infrared rays or ultrasound. The second communication unit 185 may also employ a wired connection such as Ethernet (trademark registered) IEEE 1394, HDMI (trademark registered), or USB. Each of the first communication unit 180 and the second communication unit 185 may be a communication device which functions based on the collaboration of a processor such as a CPU, a storage medium such as a RAM, and software, none of which is illustrated. The first communication unit 180 and the second communication unit 185 may be a single communication device having a plurality of communication interfaces.

The projector 100 has an image projection unit 50 which forms an optical image and projects (displays) the image on the screen SC. The image projection unit 50 is equivalent to a display unit which displays an image, and has a light source unit 55 as a light source, a light modulation unit 80, and a projection system 90.

The light source unit 55 is driven by a light source drive unit 121. The light source drive unit 121 is connected to an internal bus 188. The light source drive unit 121 turns on and off the light source of the light source unit 55 under the control of the control unit 160. As the light source turns on, outgoing light. L1, which is first light, enters the light modulation unit 80. The light source is assumed to be a xenon lamp, ultra-high-pressure mercury lamp, LED (light emitting diode), laser light source the like.

A light modulation drive unit 122 is connected to the light modulation unit 80. The light modulation drive unit 122 is connected to the internal bus 188. It is assumed that the light modulation unit 80 has liquid crystal light valves, not illustrated, each being formed by a liquid crystal panel made up of a pair of transparent substrates with liquid crystal enclosed between them, and corresponding to color light components of the three primary colors of red (R), green (G), and blue (B).

The light modulation drive unit 122 generates R, G, B image signals based on display image data inputted from the image processing unit 152. Based on the generated R, G, B image signals, the light modulation drive unit 122 drives the corresponding liquid crystal light valves of the light modulation unit 80 and thus forms images corresponding to R, C, B. The light modulation unit 80 combines the images corresponding to R, C, B by a light combining system, not illustrated, and thus generates image light L2, which is a color image.

The projection system 90 has a lens group which projects the image light L2 generated by the light modulation unit 80 into the direction of the screen SC and thus forms an image on the screen SC. The projection system 90 may also have a zoom mechanism which enlarges and reduces the image projected on the screen SC and adjusts the focal point, and a focusing adjustment mechanism which adjusts focusing.

The projector 100 has an operation panel 131 and an operation processing unit 133. The operation processing unit 133 is connected to the internal bus 188.

On the operation panel 131, which accepts an operation from the user, various operation keys and a display screen formed by a liquid crystal device 85 are displayed. When an operation key displayed on the operation panel 131 is operated, the operation processing unit 133 outputs data corresponding to the operated key to the control unit 160. The operation processing unit 133 also causes the operation panel 131 to display various screens under the control of the control unit 160.

On the operation panel 131, a touch sensor for detecting a touch on the operation panel 131 may be superimposed and integrated. The operation processing unit 133 detects a position on the operation panel 131 touched by a user's finger or the like, as an input position, and outputs data corresponding to the detected input position to the control unit 150.

The projector 100 also accepts various operation instructions from a remote controller 5 operated by the user. In this embodiment, the remote controller 5 is an external device separate from the projector 100 and has an operation instruction button 6. For example, if the user presses the operation instruction button 6 when the projector 100 is projecting an image of content displayed page by page, the projector 100 can change the projected page in response to the operation instruction button 6 thus pressed. Meanwhile, if the user presses the operation instruction button 6 when the projector 100 is not projecting any image of content, the projector 100 displays a necessary image for operation in response to the operation instruction button 6 thus pressed.

The projector 100 has a remote controller light receiving unit 132 which receives an infrared signal transmitted from the remote controller 5 used by the user. The remote controller light receiving unit 132 is connected to the operation processing unit 133.

The remote controller light receiving unit 132 receives an infrared signal transmitted from the remote controller 5. The operation processing unit 133 decodes the infrared signal received by the remote controller light receiving unit 132, thus generates data representing the content of operation on the remote controller 5, and outputs the data to the control unit 166.

The projector 100 has a state detection unit 140. A signal outputted from a camera 142 built in the projector 100 is inputted to the state detection unit 140.

The state detection unit 140 generates state information representing the state of the projector 100 based on the inputted signal and outputs the state information to the control unit 160. For example, if the projector 100 is tilted, the control unit 160 designates keystone correction based on the state information.

The camera 142 has an image pickup system, an image pickup element such as CCD, an interface circuit or the like, and captures an image of the surroundings of the screen SC, that is, in the direction of projection of the projection system 90. The camera 142 outputs image data signal of the captured image to the state detection unit 140.

The projector 100 has an image processing system. The image processing system is mainly made up of the control unit 160, which comprehensively controls the entirety of the projector 100. The image processing system also includes the image processing unit 152, a frame memory 155, an OSD processing unit 158, and a storage unit 170. The control unit 160, the image processing unit 152, the OSD processing unit 158, and the storage unit 170 are connected to the internal bus 188.

The image processing unit 152 loads image data inputted from the second communication unit 185 into the frame memory 155 under the control of the control unit 160. The image processing unit 152 carries out processing of the image data loaded in the frame memory 155, including shape correction processing such as keystone correction, digital zoom processing, or adjustment of the color tone and brightness of the image. The image processing unit 152 executes processing designated by the control unit 160, and when necessary, carries out the processing using a parameter inputted from the control unit 160. Of course, the image processing unit 152 can also execute a combination of a plurality of types of the foregoing processing.

The image processing unit 152 reads out the processed image data from the frame memory 155 and outputs the image data as display image data to the light modulation drive unit 122. If an OSD (on-screen display) image such as a menu image or message image is to be superimposed on the projected image, the image processing unit 152 reads out the processed image data from the frame memory 155 and outputs image data as display image data to the OSD processing unit 158.

The OSD processing unit 158 carries out processing to superimpose an OSD (on-screen display) image such as a menu image or message image on the projected image in response to an instruction from the control unit 160. The OSD processing unit 158 stores, in the storage unit 170, OSD image information representing a figure, font or the like to form an OSD image.

When instructed to superimpose an OSD image, the OSD processing unit 158 reads out necessary OSD image information from the storage unit 170 and combines the OSD image with the image data inputted from the image processing unit 152 in such a way that the OSD image is superimposed at a predetermined position on the projected image. The image data combined with the OSD image information is outputted to the light modulation drive unit 122.

A power supply unit 190 converts electric power supplied from an external power supply 195 into a predetermined characteristic value and supplies this characteristic value to each functional unit.

The control unit 160 has a processor such as a CPU (central processing unit) a RAM used to temporarily store various data, and a non-volatile memory such as a mask ROM, flash memory or ferroelectric memory (none of which is illustrated). The control unit 160 thus functions as a computer. The functional units of the control unit 160 are implemented by the processor operating according to a control program stored in the non-volatile memory or the storage unit 170, that is, by the collaboration of hardware and software. The control unit 160 thus comprehensively controls the operation of the projector 100. A single processor may implement the functions of the control unit 160. Alternatively, a plurality of processors may implement the functions of the control unit 160.

The control unit 160 also controls the execution of each function, based on the content of operation sent from the remote controller 5. If the content of operation sent from the remote controller 5 is an operation on the information processing device 200, the control unit 160 generates data representing the content of operation and transmits the data from the second communication unit. 185 to the information processing device 200.

The control unit 160 has a projection control unit 161 and a guidance display control unit 163, as functional units. These functional units are implemented by the collaboration of the processor and the control program stored in the ROM or the storage unit 170, none of which is illustrated.

The storage unit 170 is a non-volatile storage device and is implemented, for example, by a storage device such as a flash memory, EPROM (erasable programmable ROM), EEPROM (electrically EPROM), or HDD (hard disk drive). The storage unit 170 stores image data to be projected on the screen SC by the image projection unit 50 and various data and parameters which the control unit 160 refers to. In this embodiment, the storage unit 170 stores guidance data 172 representing guidance information including a guidance image, and connection history data 174 representing the history of connection of the second communication unit 185 of the projector 100 with the information processing device 200, or the like.

The projection control unit 161 adjusts the display form of an image by the image projection unit 50 and controls the projection of the image onto the screen SC.

Specifically, the projection control unit 161 controls and causes the image processing unit 152 to execute image processing of image data received by the second communication unit 185. In this case, the projection control unit 161 may read out from the storage unit 170 a necessary parameter for the processing by the image processing unit 152, and output the parameter to the image processing unit 152.

The projection control unit 161 also controls and causes the light source drive unit 121 to turn on the light source of the light source unit 55 and instructs the light source unit 55 about a luminance of the light source.

The guidance display control unit 163 instructs the first communication unit 180 to detect the information processing device 200. When the first communication unit 180 detects the information processing device 200, the guidance display control unit 163 functions as a control unit which controls the display of an image including a necessary operation to connect to the detected information processing device 200.

In this embodiment, if communication with the information processing device 200 located within a predetermined distance from the projector 100 (more specifically, within a predetermined distance from the first communication unit 180) is available, the guidance display control unit 163 acquires from the guidance data 172 a guidance image (guide image) including a necessary operation for the information processing device 200 and the projector 100 (more specifically, the second communication unit 185) to connect each other, and causes the image projection unit 50 to project the acquired guidance image. The guidance display control unit 163 can also choose not to cause the image projection unit 50 to project the guidance image even if communication with the information processing device 200 located within a predetermined distance is available.

In this embodiment, when causing the image projection unit 50 to project the guidance image, the guidance display control unit 163 can selectively execute at least one of the following functions.

(1) The guidance display control unit 163 determines whether the detected information processing device 200 is stored in the connection history data 174 or not, and decides whether or not to project a guidance image, based on the result of the determination. For example, if the guidance display control unit 163 determines that the projector 100 has ever been connected to the information processing device 200 and that the information processing device 200 is stored in the connection history data 174, the guidance display control unit 163 causes a guidance image to be projected. Meanwhile, if the guidance display control unit 163 determines that the projector has never been connected to the information processing device 200 and that the information processing device 200 is not stored in the connection history data 174, the guidance display control unit 163 does not cause a guidance image to be projected. The guidance display control unit 163 may also change the guidance image to be projected, according to whether the information processing device 200 is stored in the connection history data 174 or not.

(2) The guidance display control unit 163 causes a guidance image to be projected, if the information processing device 200 for which a guidance image is projected is registered in advance.

(3) The guidance display control unit 163 causes a guidance image to be projected, if the communication interface through which the second communication unit 185 can connect to the information processing device 200 is a predetermined system.

(4) If the information processing device 200 is detected while an image is being projected, the guidance display control unit 163 decides the form in which a guidance image is projected according to the display state of the projected image. For example, if an image is being projected, a guidance image is not projected. Alternatively, if an image is being projected, a guidance image is projected instead of the currently projected image. Alternatively, if an image is being projected, a guidance image is projected in a reduced size. Also, if an image is being projected, the user may be notified of the detection of the information processing device 200, using the OSD display.

(5) The guidance display control unit 163 causes all guidance images corresponding to the detected information processing device 200 to be projected at a time. If not all such guidance images can be projected at a time, the guidance image for the communication interface that connects for the first time is projected first and made switchable to the other guidance images by an operation on the remote controller 5.

(6) If the communication with the information processing device 200 is disconnected when a guidance image is being projected, the guidance display control unit 163 ends the projection of the guidance image.

Figure 2:
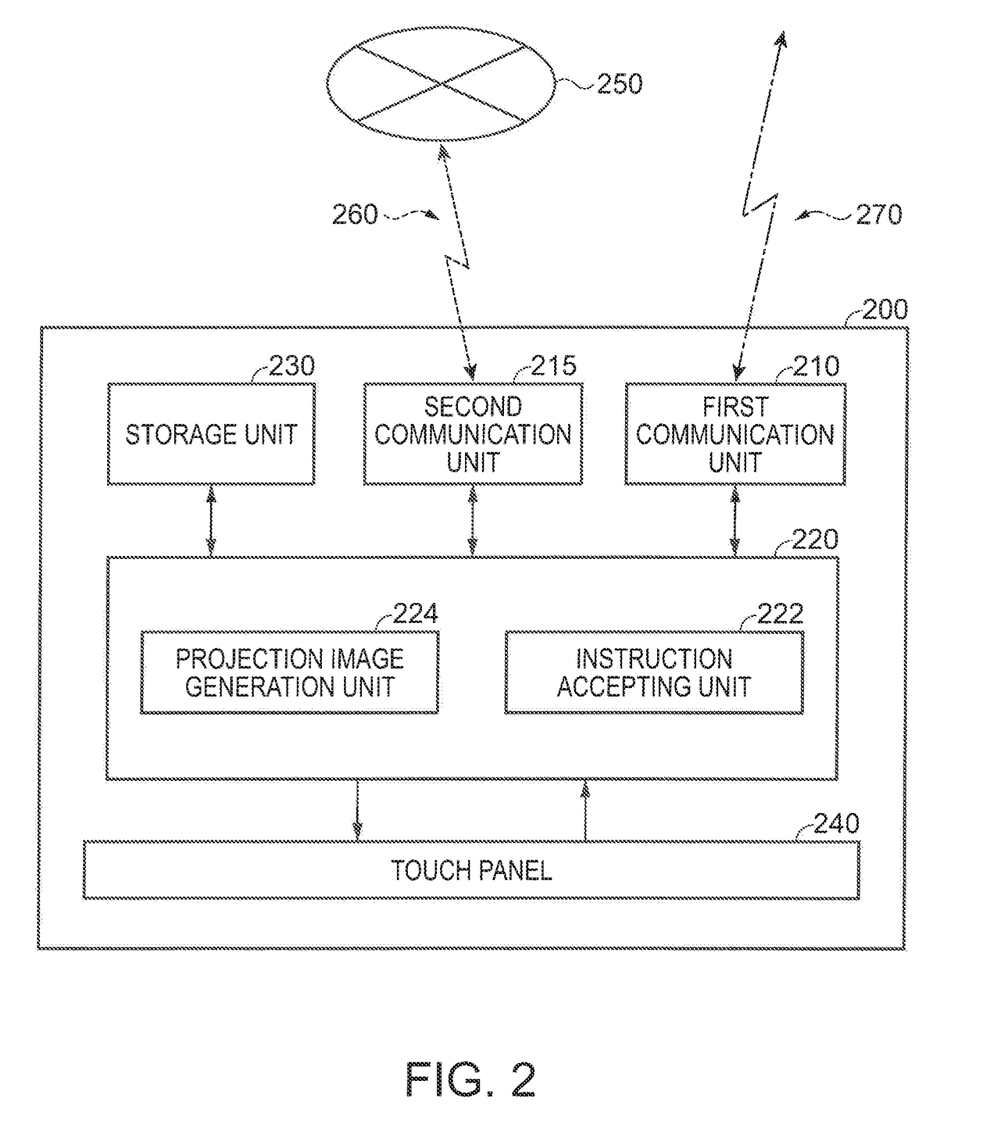
FIG. 2 shows the configuration of an information processing device.

FIG. 2 shows the configuration of the information processing device 200 connected with the projector 100.

The information processing device 200 has a first communication unit 210, a second communication unit 215, a storage unit 230, a control unit 220, and a touch panel 240.

In this embodiment, the information processing device 200 is assumed to be, for example, a high-function mobile phone such as a smart phone, or a multi-function mobile terminal such as a tablet terminal.

The first communication unit 210 has a communication interface supporting short-range wireless communication such as Bluetooth (trademark registered) and communicates with the projector 100 supporting a communication interface based on Bluetooth. In this embodiment, if the first communication unit 210 receives a search signal based on Bluetooth, the first communication unit 210 transmits a response signal corresponding to the received search signal. The response signal includes information such as the name, MAC address, and available connection method or the like of the information processing device 200.

The second communication unit 215 transmits and receives data to and from the projector 100 via wireless communication. For example, the second communication unit 215 has the function of transmitting image data to be projected by the projector 100.

The storage unit 230 stores content data in a file format representing an image or document, and program data such as an application executable by the information processing device 200. The application is assumed to be an operation program to operate the projector 100 or an application program to implement a predetermined function. In this embodiment, the storage unit 230 is assumed to be, for example, a flash memory or the like.

The touch panel 240 displays an image including a user interface of an application program and accepts a user's instruction to the user interface.

The control unit 220 controls the operation of each functional unit of the information processing device 200.

The control unit 220 has an instruction accepting unit 222 and a projection image generation unit 224, as functional blocks.

The instruction accepting unit 222 analyzes the content of an operation carried out by the user via the touch panel 240 and accepts an instruction based on the content of the operation. As such an instruction, for example, an operation on an image projected by the projector 100 is conceivable. The control unit 220 instructs each functional unit about a predetermined operation, based on the accepted instruction.

The projection image generation unit 224 generates image data that can be projected by the projector 100, based on an instruction from the control unit 220. For example, if the currently executed application program displays on the touch panel 240 images that can be projected by the projector 100 and the user designates a desired image from among the images that can be projected, the projection image generation unit 224 generates image data in a format that enables the projector 100 to project the designated image. The generated image data is transmitted from the second communication unit 215 to the projector 100.

The control unit 220 may be implemented, for example, by a computer having a processor, a RAM, a ROM and the like, none of which is illustrated. The computer may have various dedicated processing circuits such as an image processing circuit. The control unit 220 may also be implemented by an ASIC (application specific integrated circuit) or the like.

The respective functions of the control unit 220 represent functional configurations implemented by the collaboration of hardware and software and are not particularly limited in their specific forms of installation. Therefore, hardware corresponding individually to each functional unit need not necessarily installed. Of coarse, the functions of a plurality of functional units may be implemented by one processor executing a program. Also, a part of the functions implemented by software in the embodiment may be implemented by hardware, and a part of the functions implemented by hardware may be implemented by software.

Figure 3:
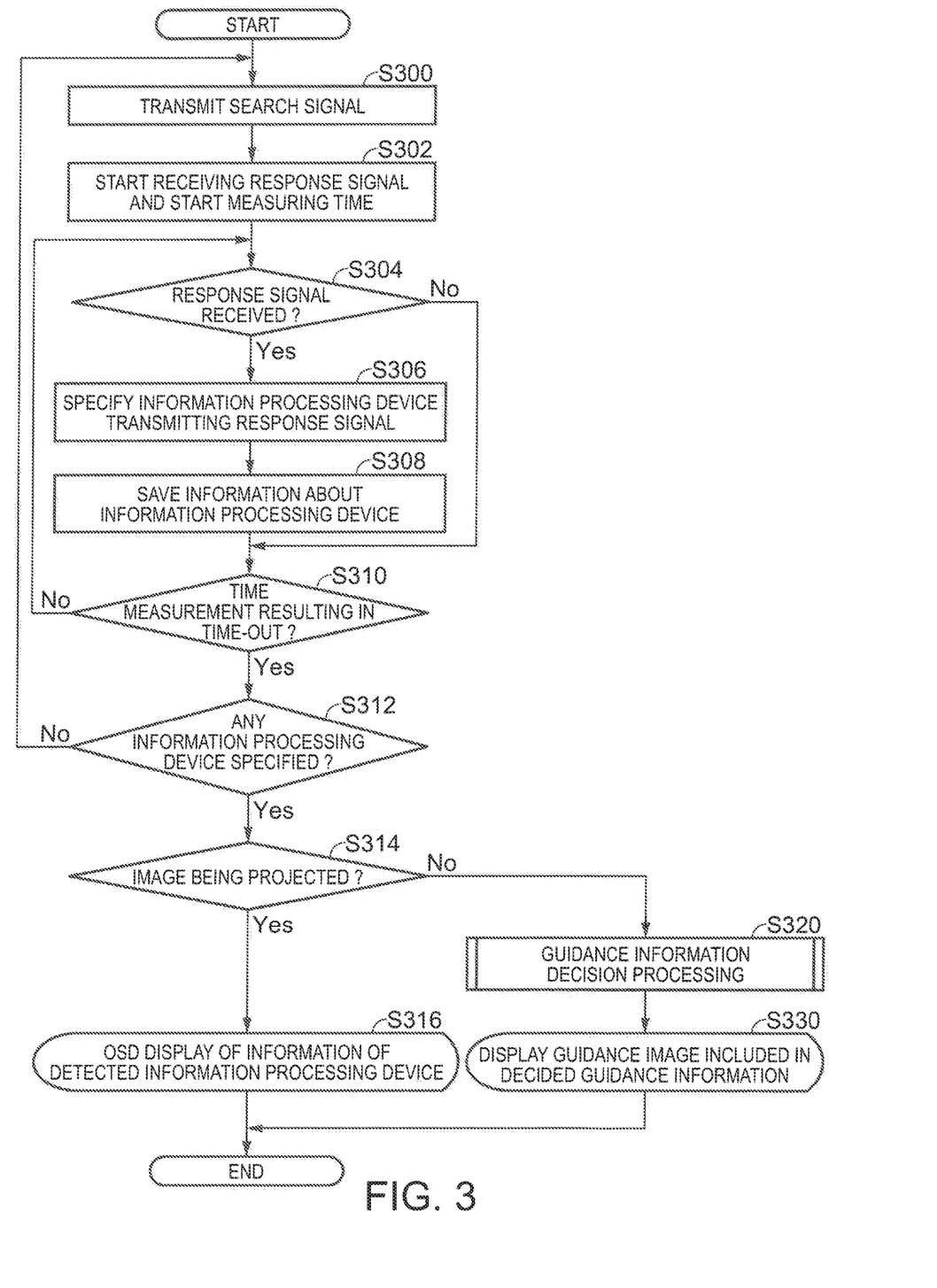
FIG. 3 is a flowchart showing processing for a projector to project a guidance image.

Next, FIG. 3 is a flowchart showing a flow of processing for the projector 100 to project a guidance image (control method).

In the description below, a plurality of wireless connection methods for connecting the second communication unit 185 with the information processing device 200 is assumed to be one of wireless LAN and screen mirroring. Therefore, a guidance image to be projected is one of a guidance image for connection via wireless LAN and a guidance image for connection via screen mirroring.

This processing is executed when electric power is supplied to the power supply unit 190 of the projector 100 or when the display setting of the guidance image is changed. Therefore, the processing is not executed if disablement of the display setting of the guidance image is selected.

As this processing starts, the guidance display control unit 163 causes the first communication unit 180 to transmit a search signal for detecting an information processing device 200 by broadcast (step S300).

Next, the guidance display control unit 163 causes the first communication unit 180 to start receiving a response signal to the search signal, and starts measuring the elapsed time (step S302).

Next, the guidance display control unit 163 determines whether the first communication unit 180 has received a response signal or not (step S304).

If it is determined that the first communication unit 180 has not received a response signal (No in step S304), the guidance display control unit 163 goes to step S310.

Meanwhile, if it is determined that the first communication unit 180 has received a response signal (Yes in step S304), the guidance display control unit 163 analyzes the received response signal and specifies the information processing device 200 transmitting the response signal (step S306).

Next, the guidance display control unit 163 saves information about the specified information processing device 200 (step S308) and goes to step S310.

In step S310, the guidance display control unit 163 determines whether or not the measured elapsed time exceeds a reference value, resulting in a time-out.

If it is determined that the elapsed time has not resulted in a time-out (No in step S310), the guidance display control unit 163 returns to step S304.

Meanwhile, if it is determined that the elapsed time has resulted in a time-out (Yes in step S310), the guidance display control unit 163 aces to step S312.

In step S312, the guidance display control unit 163 determines whether any information processing device 200 is specified or not.

If no information processing device 200 is specified (No in step S312), the guidance display control unit 163 returns to step S300 and detects the information processing device 200.

Meanwhile, if any information processing device 200 is specified (Yes in step S312), the guidance display control unit 163 determines whether an image is being projected or not (step S314).

Figure 4:
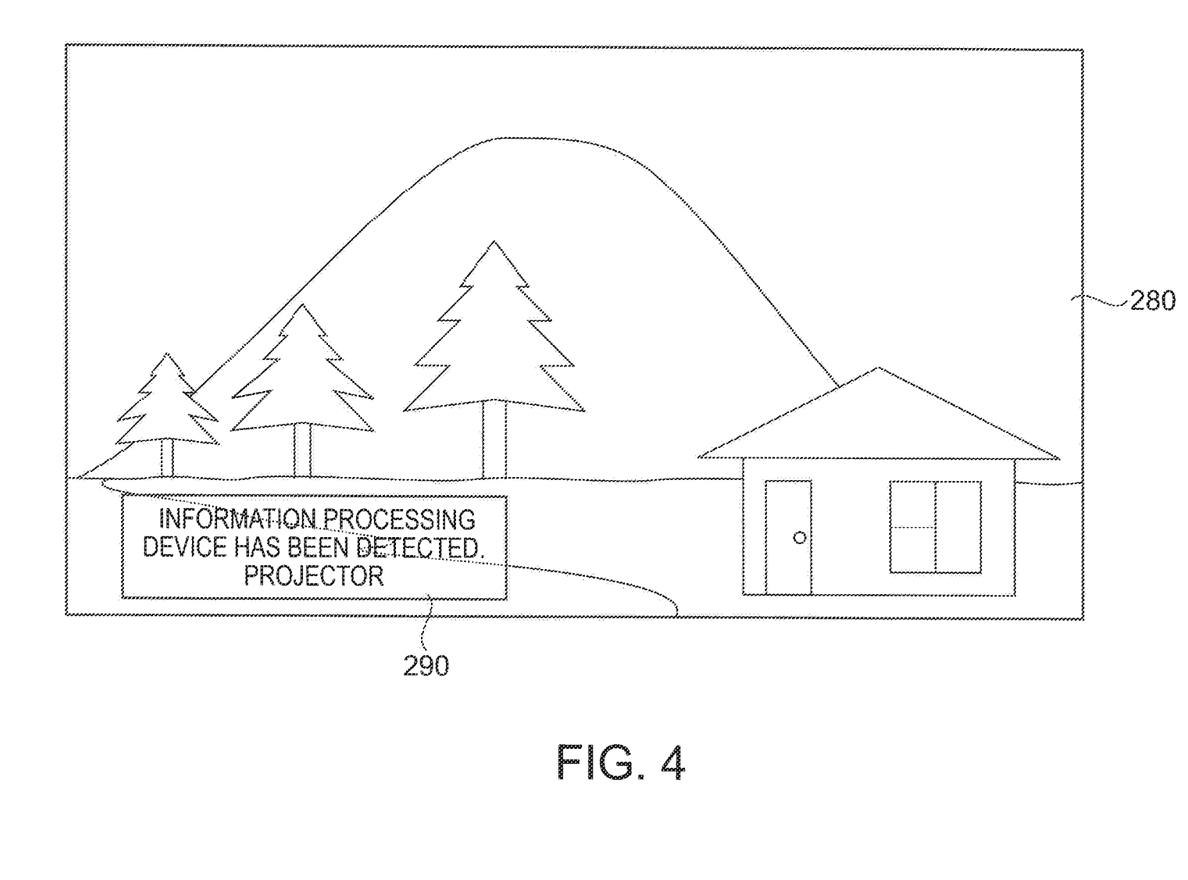
FIG. 4 shows an example of a projection image with an OSD image superimposed thereon.

If it is determined that an image is being projected (Yes in step S314) the guidance display control unit 163 superimposes the information of the information processing device 200 that is detected and specified, onto the projected image, and thus shows an OSD display (step S316). The guidance display control unit 163 then ends the processing. FIG. 4 shows an example of a projection image 280 with an OSD image 290 superimposed thereon showing information of the information processing device 200 that is detected and specified. In this way, the user can recognize that the information processing device 200 is within a predetermined short distance.

Back to FIG. 3, if it is determined that an image is not being projected (No in step S314), the guidance display control unit 163 executes guidance information decision processing (step S320), causes a guidance image included in the decided guide information to be projected and displayed (step S330), and ends the processing.

Figure 5:
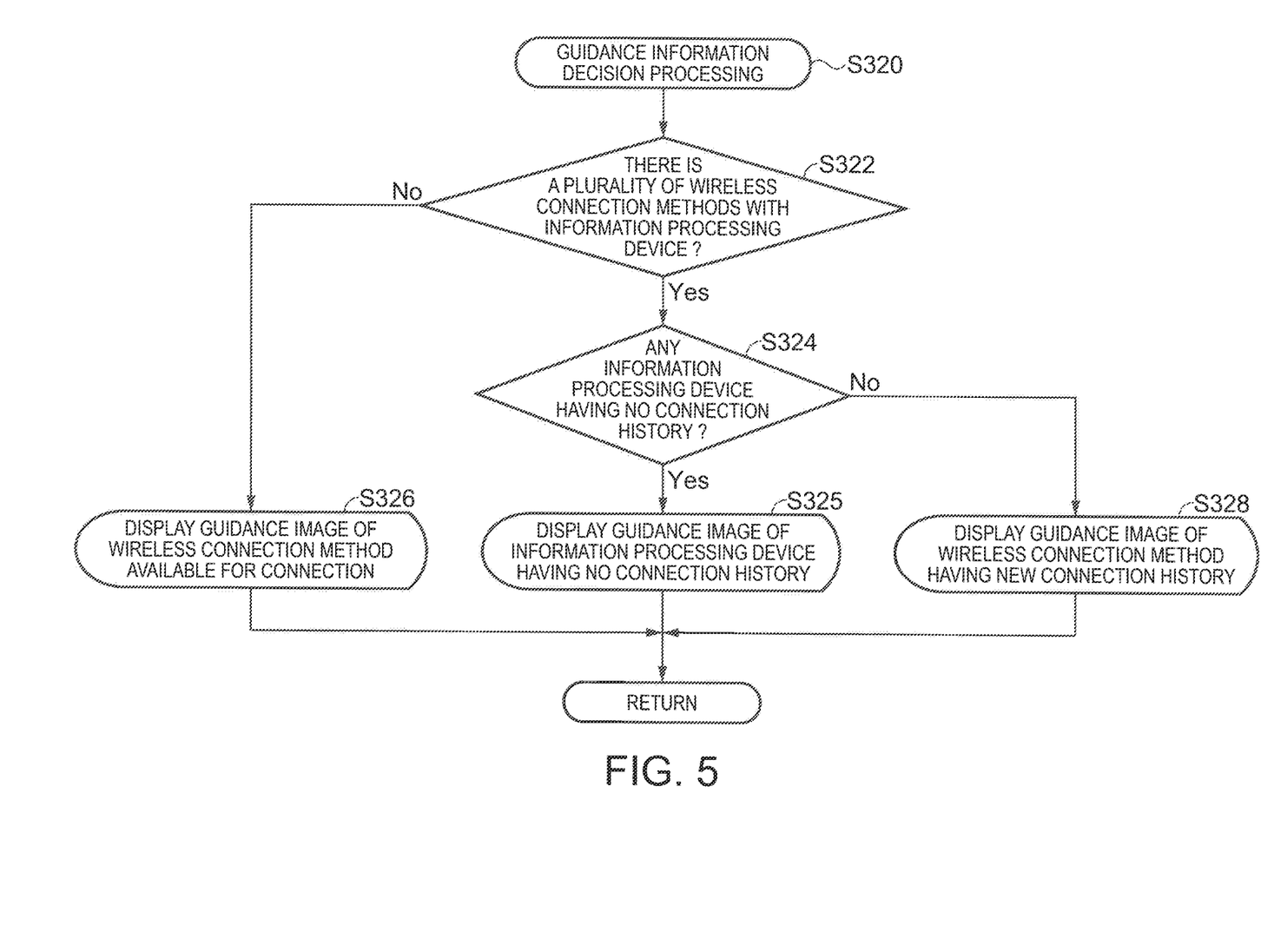
FIG. 5 is a flowchart showing guidance information decision processing.

Next, details of the guidance information decision processing will be described. FIG. 5 is a flowchart showing the guidance information decision processing.

As this processing starts, the guidance display control unit 163 determines whether or not there is a plurality of wireless connection methods available for the projector 100 and the information processing device 200 to connect each other, based on the response signal from the information processing device 200 (step S322).

If it is determined that there is one wireless connection method with the information processing device 200 (No in step S322), the guidance display control unit 163 ads out guidance information of the wireless connection method available for connection from the guidance data 172 in the storage unit 170, causes a guidance image included in the read-out guidance information to be projected and displayed (step S326), and ends the processing.

Meanwhile, if it is determined that there is a plurality of wireless connection methods with the information processing device 200 (Yes in step S322), the guidance display control unit 163 reads out connection history from the connection history data 174 in the storage unit 170, and determines whether there is any information processing device 200 having no connection history or not (step S324).

If it is determined that there is no information processing device 200 having no connection history (No in step S324), the guidance display control unit 163 reads out guidance information of a wireless connection method having new connection history from the guidance data 172 in the storage unit 170, as with the wireless connection method of the previous connection, and causes a guidance image included in the read-out guidance information to be projected and displayed (step S328). The guidance display control unit 163 then ends the processing.

Meanwhile, if it is determined that there is an information processing device 200 having no connection history (Yes in step S324), the guidance display control unit 163 reads out guidance information of the wireless connection method having no connection history from the guidance data 172 in the storage unit 170, causes a guidance image included in the read-out guidance information to be projected and displayed (step S325), and ends the processing.

If there is a plurality of wireless connection methods having no connection history with a plurality of information processing devices 200, the guidance display control unit 163 may employ guidance information of the wireless connection method corresponding to the largest number of information processing devices 200, as a projection target. Also, if there is one wireless connection method each, having no connection history with one of a plurality of information processing devices 200, the guidance display control unit 163 may employ the wireless connection method corresponding to the largest number of information processing devices 200, of all the information processing devices 200, as a projection target.

The above embodiment has the following effects.

(1) The projector 100 detects an information processing device 200 connectable via wireless communication by the first communication unit 180. When the information processing device 200 is detected, the projector 100 causes the image projection unit 50 to project a guidance image including a necessary operation to connect to the detected information processing device 200. This enables the user to carry out the necessary operation to connect to the information processing device 200 according to the projected guidance image. Therefore, the projector 100 and the information processing device 200 can be connected to each other easily and quickly, thus improving convenience.

(2) The projector 100 projects the guidance image if the first communication unit 180 detects the information processing device 200 within a predetermined distance. Therefore, the projector 100 can properly display the guidance image corresponding to the information processing device 200 in the predetermined distance.

(3) The projector 100 can display the guidance image if the information processing device 200 to which the projector 100 has ever been connected in the past is detected.

(4) The projector 100 can display the guidance image according to the history of connection to the detected information processing device 200.

(5) The projector 100 can display the guidance image if the detected information processing device 200 is registered.

(6) The projector 100 can display the guidance image if the projector 100 connects to the detected information processing device 200 by a predetermined connection method.

(7) The projector 100 is able not to display the guidance image further, if the image projection unit 50 is already projecting an image.

(8) The projector 100 can display the guidance image according to the display state of the projected image. This can optimize the display of the image projected by the image projection unit 50.

(9) The projector 100 can acquire data of the image to be projected, from the connected information processing device 200.

The invention has been described above, based on the illustrated embodiment. However, the invention is not limited to the embodiment. The following modifications are also conceivable.

(1) The projector 100 is not limited to the method using liquid crystal light valves and can also employ other methods such as DLP (digital light processing) and LCOS (liquid crystal on screen).

(2) The display device is not limited to the projector 100. For example, a direct-view display device such as a liquid crystal display, organic EL display, head-mounted display may be employed.

(3) The guidance data 172 is not limited to the configuration of being stored in advance in the storage unit 170. For example, the second communication unit 185 may acquire guidance information from an external database via the internet or the like.

What is claimed is:

1. A display device comprising:
   a display unit which displays an image;
   a detection unit which detects an information processing device connectable via wireless communication, wherein the detection unit detects the information processing device prior to connection of the display device to the information processing device; and
   a control unit which
   makes a determination whether a display prohibition condition is met,
   causes the display unit to display a guide image showing an operation that is necessary to achieve connection of the display device to the information processing device, in response to (i) the detection unit detecting the information processing device and (ii) the determination indicating that the display prohibition condition is not met, and
   prohibits the display unit from displaying the guide image in response to (i) the detection unit detecting the information processing device and (ii) the determination indicating that the display prohibition condition is met, wherein
   the control unit
   determines whether the display prohibition condition is met by determining whether the information processing device detected by the detection unit and the display device have ever been connected to each other or not,
   determines that the display prohibition condition is not met, and causes the display unit to display the guide image, if the display device has ever been connected to the information processing device, and
   determines that the display prohibition condition is met, and prohibits the display unit from displaying the guide image, if the display device has never been connected to the information processing device.

2. The display device according to claim 1, wherein the detection unit detects the information processing device located within a predetermined distance from the display device.

3. The display device according to claim 1, wherein the control unit decides the guide image displayed on the displayed unit, based on the result of the determination of whether the information processing device detected by the detection unit and the display device have ever been connected to each other or not.

4. The display device according to claim 1, wherein the control unit causes the display unit to display the guide image according to a display state of the image on the display unit.

5. The display device according to claim 1, wherein the control unit ends the display of the guide image displayed on the display unit, if the information processing device detected by the detection unit can no longer be detected.

6. The display device according to claim 1, comprising a receiving unit which receives data of the image transmitted from the information processing device connected thereto.

7. A method for controlling a display device, the method comprising:
   detecting an information processing device connectable via wireless communication, wherein the information processing device is detected prior to connection of the display device to the information processing device;
   making a determination whether a display prohibition condition is met;
   displaying a guide image showing an operation that is necessary to achieve connection of the display device to the information processing device, in response to (i) the information processing device being detected and (ii) the determination indicating that the display prohibition condition is not met; and
   prohibiting display of the guide image in response to (i) the information processing device being detected and (ii) the determination indicating that the display prohibition condition is met, wherein
   the making of the determination of whether the display prohibition condition is met includes determining whether the detected information processing device and the display device have ever been connected to each other or not,
   the determination indicates that the display prohibition condition is not met, and the guide image is displayed, if the display device has ever been connected to the information processing device, and
   the determination indicates that the display prohibition condition is met, and display of the guide image is prohibited, if the display device has never been connected to the information processing device.

* * * * *